United States Patent [19]

Nielsen

[11] Patent Number: 5,547,578
[45] Date of Patent: Aug. 20, 1996

[54] METHOD OF CONTROLLING WASTE WATER PURIFICATION PLANTS USING QUALITY EVALUATION OF MEASURING DATA

[75] Inventor: Marinus K. Nielsen, Virum, Denmark

[73] Assignee: I. Krüger Systems A/S, Søborg, Denmark

[21] Appl. No.: 211,135
[22] PCT Filed: Oct. 1, 1992
[86] PCT No.: PCT/DK92/00291
 § 371 Date: Mar. 22, 1994
 § 102(e) Date: Mar. 22, 1994
[87] PCT Pub. No.: WO93/07089
 PCT Pub. Date: Apr. 15, 1993

[30] Foreign Application Priority Data

Oct. 1, 1991 [DK] Denmark .................. 1677/91

[51] Int. Cl.$^6$ .................. C02F 1/00; C02F 3/00
[52] U.S. Cl. .................. 210/614; 210/739; 210/96.1
[58] Field of Search .................. 210/614, 96.1, 210/739–746

[56] References Cited

FOREIGN PATENT DOCUMENTS

0446036A2 3/1991 European Pat. Off. .

OTHER PUBLICATIONS

M. Kümmel et al., "Computer Control of an Alternating Activited Sludge Process" in The International Symposium on Process Systems Engineering, Kyoto, Japan, Aug. 23–27, 1982.

S. Lindberg et al., "Real Time Optimization of a Sewer System . . . Operation" in Fifth International Conference on Urban Storm Drainage, Osaka, Japan (1990) pp. 1299–1303.

Primary Examiner—Thomas G. Wyse
Attorney, Agent, or Firm—Watson Cole Stevens Davis, P.L.L.C.

[57] ABSTRACT

A method of controlling a wastewater purification plant comprises the steps of measuring two or more of a number of parameters, automatically controlling the plant on the basis of the measurement values obtained using a mathematical model for the purification process, evaluating the quality of the measurement value for at least one parameter on the basis of a comparison of the said value with an expected, dynamic value interval calculated continuously on the basis of said mathematical model and a simultaneous and/or a previous measurement of one or several other parameters and/or a previous measurement of the same parameter, and controlling the plant on the basis of the quality evaluated measurement values.

10 Claims, 2 Drawing Sheets

METHOD OF CONTROLLING WASTE WATER PURIFICATION PLANTS USING QUALITY EVALUATION OF MEASURING DATA

BACKGROUND OF THE INVENTION

1. Field of the Invention

The present invention relates to a method of controlling a waste water purification plant wherein two or more parameters, such as the concentration of ammonium, nitrate, oxygen and phosphate and oxygen supply, are measured and the plant is automatically controlled on the basis of the measurement values obtained using a mathematical model for the purification process.

2. The Prior Art

When treating, e.g., municipal waste water in a biological purification plant, where a removal of nitrogen and phosphate-containing compounds and organic matter is typically desired, considerable variations occur during a day, both in the concentration of the polluting substances in the waste water and in the amount of waste water supplied to the purification plant. The great variation in the load of the plant makes heavy demands on the control of the plant in order to prevent the concentration of the polluting substances in the effluent from exceeding the maximum limit values.

The control of biological purification plants is typically based on measurements of primarily phosphate, nitrate, ammonium and oxygen carried out with photo or electrochemical electrodes (sensor systems). Such sensor systems are very sensitive and require continuous maintenance and frequent calibration, in particular in connection with measurements carried out in liquid mixtures from biological purification plants, which i.a. is due to the fact that such liquid mixtures contain many interfering substances, and that the particles and active sludge contained therein give rise to bacterial growth in the sensor systems as well as clogging thereof.

As a result, measurements carried out using sensors, and in particular the measurements of nitrate and ammonium, are very unreliable and present a central problem in the control of biological purification plants.

"Computer Control of an Alternating Activated Sludge Process" by Kümmel M. and Nielsen M. K., published at The International Symposium on Process Systems Engineering, Kyoto, Aug. 23–27, 1982 discloses a method of controlling a biological purification plant comprising two treatment tanks which are alternately operated in anoxic and aerobic conditions and wherein the flow pattern is changed accordingly and so that the untreated waste water is supplied to the anoxic tank, from which it is carried to the aerobic tank and therefrom further on in the plant to a clarification tank in which a sedimentation of active sludge is carried out, which sludge is subsequently recycled in the plant for introduction into the anoxic tank, and from which clarification tank the effluent is discharged.

The control is effected by means of a computer collecting the measurement results, analyzing the results on the basis of a mathematical model, and implementing new control strategies.

In the noted prior art method, measurements of oxygen, ammonium and nitrate are carried out using suitable sensors, the control parameters used being the oxygen supply rate and the nitrification and denitrification period ratio.

In the prior art method, the measurements of ammonium and nitrate concentrations are used continuously to determine the corresponding optimum oxygen concentration (the set point) during the nitrification and denitrification processes, respectively.

Furthermore, the nitrification and denitrification period ratio is controlled relative to the content of ammonium in the untreated waste water, i.e., such that the nitrification period is prolonged when the ammonium load is high and shortened when the ammonium load is low, and vice versa for the denitrification period.

"Real Time Optimization of a Sewer System as Part of a Larger Municipal Prototype Project Including Treatment Plant Operation", by Lindberg S. et al., Fifth International Conference on Urban Storm Drainage, Osaka 1990, pp. 1299–1303, discloses a system for controlling a sewer and waste water treatment plant.

This control system comprises a data quality control module serving to evaluate the quality of the measurements carried out of the hydraulics of the plant. The evaluation is effected by discarding measurements which, in the light of the retrospective course of the measurements, are considered to be erroneous or which deviate considerably from what is to be expected on the basis of other hydraulic measurements.

The quality evaluation is effected by discarding measurement values which are not comprised within a value interval having fixed minimum and maximum limits and/or by discarding values, the changes of which compared to the most recent measurement are outside a value change interval having fixed minimum and maximum limits.

EP-A-0,446,036 discloses an apparatus for controlling a system, e.g., a waste water purification plant, the apparatus comprising 1) a number of measuring units, 2) means for analysing measurement data in order to select a characteristic data set, 3) means for analysing the characteristic data set in order to identify a possible operation problem, 4) means for analysing the operation problem in order to find a strategy for resolution of the problem, and 5) means for controlling the system on the basis of the strategy.

The means for analysing measurement data is used i.a. for affecting an evaluation of measurement data. The evaluation step does not include the use of a mathematical model of the deterministic/stochastic type but is based merely on the use of functions expressing empirical a priori information about the time course of the parameter for which a measurement value is being evaluated.

SUMMARY OF THE INVENTION

The object of the present invention is to provide a method of the type mentioned which provides a more reliable, quickly adjustable and hence more efficient control.

The method according to the invention is characterized in that the quality of the measurement value for at least one parameter is evaluated on the basis of a comparison of the value with an expected, dynamic value interval calculated continuously on the basis of the mathematical model and a simultaneous and/or an earlier measurement of one or several other parameters and/or a previous measurement of the same parameter, and that the plant is controlled on the basis of said evaluated measurement values.

The invention is based on the discovery that some of the parameters measured during the control of a waste water purification plant provide information about the same physical conditions and that such parameters therefore may be used for mutual quality evaluation by use of the mathematical model expressing the correlation between the parameters.

Thus, the method according to the invention provides a possibility of minimizing the influence of the measurement unreliability on the process control.

In the method according to the invention, the value interval forming the basis of the comparison of a given measurement value is continuously calculated, which calculation is carried out on the basis of simultaneous measurements of other parameters and/or immediately preceding measurements of the same or other parameters, thereby resulting in a value interval which exactly corresponds with the actual state of the plant.

The value interval calculated according to the invention thus provides a far more precise and restrictive standard of comparison for carrying out the quality evaluation than the value interval used in the above prior art method.

Consequently, the use of the method according to the invention provides a far more efficient and valuable quality evaluation of measurement data and hence an improved control of the purification plant.

Furthermore, the use of the method according to the invention makes it possible to identify significant and sudden changes in the parameters measured in a quick and reliable manner, thereby resulting in a considerable improvement of the efficiency of the control compared to the prior art control methods.

This is of a particularly great value in connection with the control of waste water purification plants where, as mentioned above, the obtainable measurements are often associated with great unreliability.

The expected dynamic value interval is preferably determined by calculation of an expected dynamic value and maximum deviations therefrom.

A preferred embodiment of the invention is characterized in that the credibility of the measurement value is evaluated on the basis of the comparison of the measurement value with the expected dynamic value interval by allocation of a credibility factor which, in combination with the measurement value, is used in the subsequent selection of the final control action.

Another preferred embodiment of the invention is characterized in that the measurement value is corrected with a value corresponding to the magnitude of identifiable measurement interference, if any, and that the corrected measurement value is used in a subsequent selection of the final control action.

As used herein the expression "identifiable measurement interference" means measurement interference caused by influences imposed on the purification plant in connection with the control of same.

The quantification of the identifiable measurement interference is preferably carried out on the basis of the mathematical model and past data of response courses for control modifications of the same type carried out previously.

The method according to the invention is preferably carried out using an integral control and computer system (control apparatus) collecting and storing measurement data and control signals, processing the collected data using the mathematical model and implementing new control actions.

The waste water purification plant controlled by the method according to the invention may be a biological waste water purification plant, in which the treatment is carried out using microorganisms.

BRIEF DESCRIPTION OF THE DRAWINGS

The invention will now be explained in further details with reference to the drawings, wherein.

DETAILED DESCRIPTION OF THE PREFERRED EMBODIMENT

Figure 1:
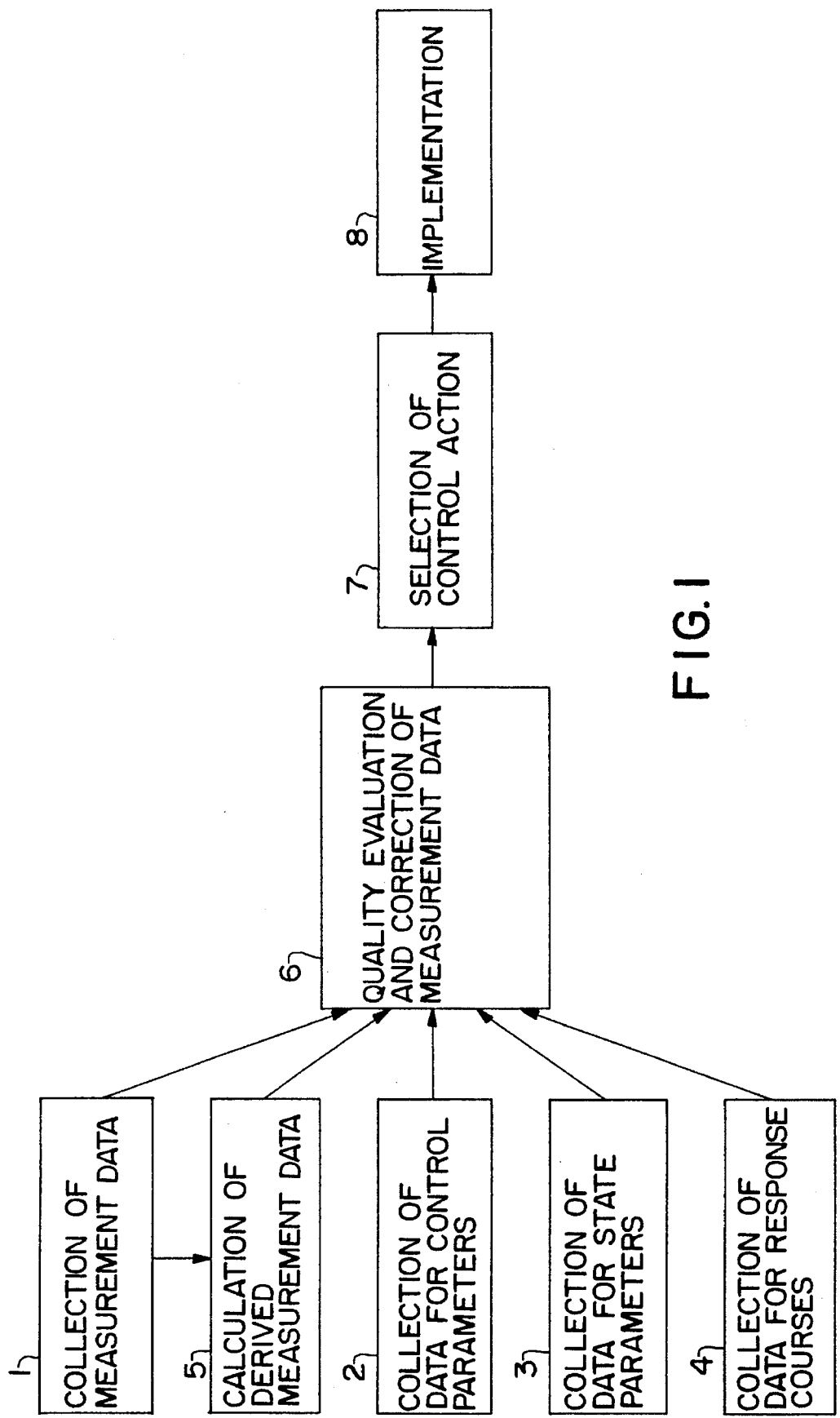
FIG. 1 is a block diagram of the general action steps in controlling a waste water purification plant using a preferred embodiment of the method according to the invention.

The action steps shown in FIG. 1 will now be explained in further details.

By using various measurement apparatuses, measurements of a number of parameters are carried out sequentially at different places in the waste water purification plant, and the measurement data thus obtained are collected (step 1) in the data base of a control apparatus. Examples of such measurement parameters comprise the concentration of ammonium, nitrate, oxygen, phosphate, cell dry matter and biomass in the untreated waste water, at various places in the purification plant and in the effluent, the amount of supplied untreated waste water and the amount of the oxygen supplied to the plant.

Furthermore sequential data are collected in the data base of the control apparatus for a number of different control parameters (step 2), sequential data for a number of parameters (step 3) describing the state of the purification plant, such as time of the day and flow pattern, and data for the response course of the purification plant (step 4) on control actions previously made.

On the basis of the collected measurement data, derived measurement data are computed in the control apparatus (step 5), such as the rate of change of the oxygen concentration, the oxygen consumption rate and the nitrification and denitrification rate.

On the basis of the data collected during steps 1–5, a quality evaluation and correction of the measurement data collected in step 1 is carried out in step 6.

The set of quality evaluated and corrected measurement data obtained in step 6 forms the basis of a selection of the final control action (step 7).

The control action may be determined using a mathematical model defining the correlation between the measurement parameters and the control parameters and describing the state of the purification plant at the relevant point of time. Alternatively the control action may be determined on the basis of a predetermined set of rules.

The selected control action may either be based on what is referred to as the principle of multiplication, i.e., the measurement values and the credibility factors are multiplied, or on what is referred to as the principle of addition, i.e., the measurement values and credibility factors are added, or a combination of these principles.

After the final control action has been selected, it is implemented (step 8). The control apparatus effects the implementation by modification of the setting of the control apparatus associated with the individual control parameters.

Figure 2:
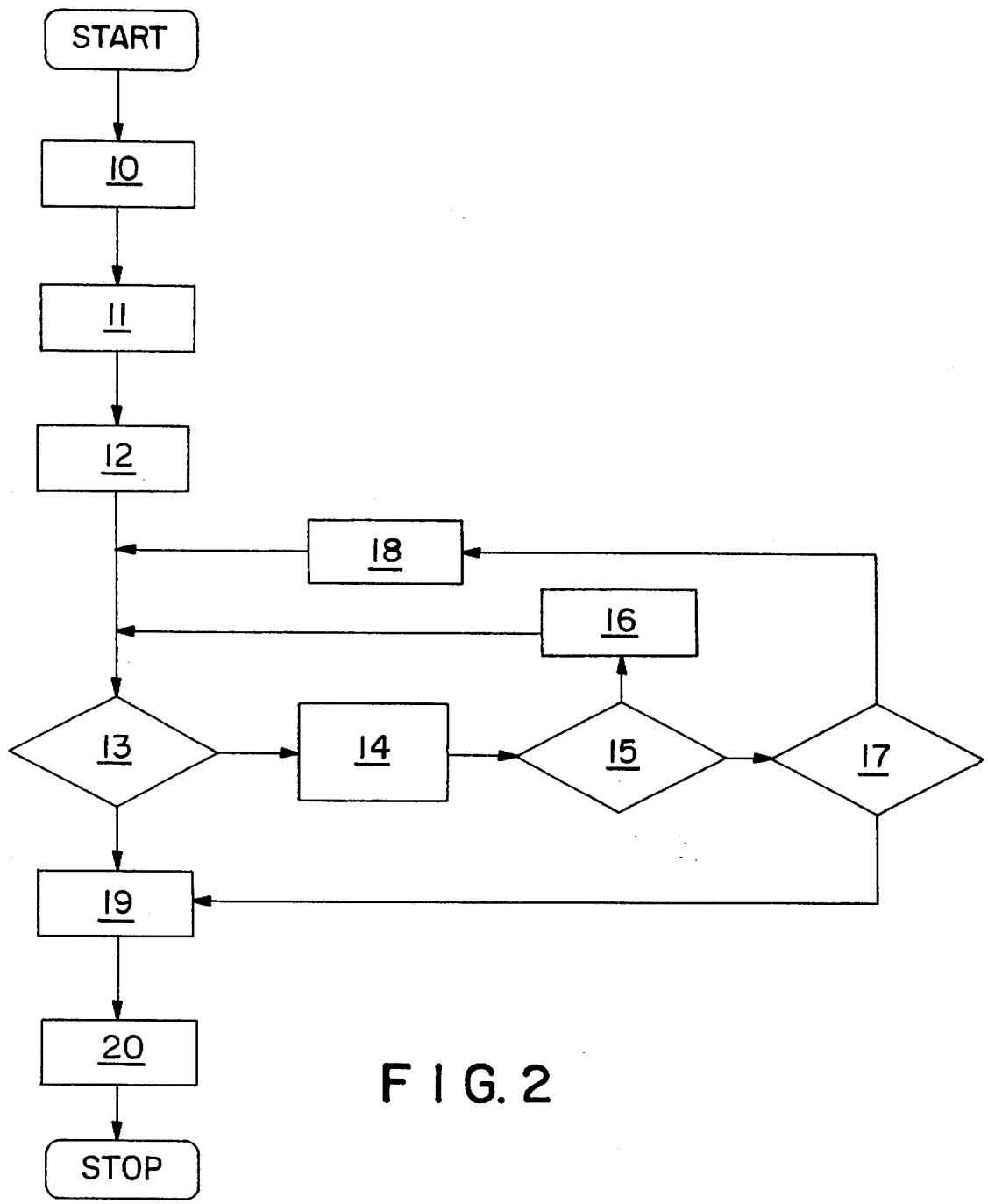
FIG. 2 is a flow diagram of the action steps in the quality evaluation and correction of a measurement value in a preferred embodiment of the method according to the invention.

With reference to FIG. 2 it will now be explained in further detail how the above-mentioned quality evaluation and correction (step 6) is carried out.

A given measurement value is initially subjected to a primary evaluation (step 10) comprising investigating whether the measurement value is comprised within a value interval of fixed and relatively wide limits corresponding to the maximum and minimum, respectively, values of the relevant measurement parameter appearing in ordinary operation conditions.

Furthermore, the primary evaluation comprises investigating whether the change of the measurement value as compared to the latest measurement carried out is comprised within a value change interval set so as also to have fixed and relatively wide limit values corresponding to the maximum change values of the relevant measurement parameter appearing in ordinary operation conditions.

If the measurement value is not comprised within the above value interval, or if the change of the measurement value is not comprised within the above value change interval, the measurement value is rejected as erroneous.

Thus, the primary evaluation serves to discard the evidently erroneous measurements.

The state of the waste water purification plant at the time of the measurement is then identified (step 11), cf. step 3 described above.

In steps 12 and 13 the measurement value is verified, i.e., it is evaluated whether the value is correct or not.

The verification is effected by determining (step 13) whether the measurement value is comprised within a value interval determined on the basis of an expected value and maximum deviations therefrom, which may be computed (step 12) on the basis of the data collected in steps 1–5 and the mathematical model quantitatively describing the correlation between different parameters.

An example of such calculation of the expected value and maximum deviations therefrom is that the ammonium concentration in a given treatment tank is calculated on the basis of measurements of the amount of waste water supplied to the plant and the time of the day providing indirect information about the ammonium concentration of the supplied waste water, and/or the past course for the ammonium concentration in the treatment tank, and/or the past course for the nitrate concentration in the treatment tank, and/or the oxygen concentration in the treatment tank and the amount of oxygen supplied thereto, together providing information about the oxygen consumption rate.

When using several methods to calculate the expected value and maximum deviations therefrom, the methods are weighted according to their credibility.

If the measurement value is not comprised within the calculated value interval, the deviation of the measurement value from the expected value is calculated and stored (step 14).

Subsequently, it is investigated whether the measurement value includes identifiable measurement interference (step 15). Such identifiable measurement interference results from modifications made in the state of the purification plant in order to control the plant, such as modifications in the flow pattern of the purification plant by control of the pump operation and change in the oxygen supply rate to a treatment tank by control of the supply pump.

Such control modifications give rise to a relatively brief change of the measured parameter, which change of measurement parameter is not symptomatic of the general state dynamic of the plant.

Consequently, such brief change of the measurement parameter is neglected by correcting the measurement value with a value corresponding to the interference (step 16). The quantification of the interference is carried out on the basis of the mathematical model and past data of the response courses for modifications of the same type previously made, which data are collected and stored in the memory of the control apparatus.

After the measurement value has been corrected, it is investigated again whether the corrected measurement value is comprised within the value interval calculated in step 12.

If it is found in step 15 that the measurement value does not include any identifiable interference, it is investigated whether the value interval calculation made in step 12 is incorrect (step 17), which, e.g., may be the case if sudden changes in the load of the purification plant occur, i.e., changes in the amount and/or the concentration of the waste water supplied to the plant. Thus, step 17 includes measurement values for further measurement parameters compared to the measurement parameters forming the basis of the value interval calculation made in step 12.

If it is found in step 17 that the state of the purification plant has changed so that the value interval calculation made in step 12 is incorrect, a revised value interval (step 18) is computed on the basis of the measurement parameters used in steps 12 and 17, which revised value interval is used for comparison with the measurement value approved in step 10 and possibly corrected in step 15.

As explained above, initially only measurement results for a limited set of measurement parameters are preferably used for the value interval calculation made in step 12, as measurement results for a further set of measurement parameters are only included, if it is found that the measurement value is beyond the value interval initially computed. Such division of the verification procedure is preferred in order to limit the calculation work associated therewith and hence the necessary computer capacity.

Alternatively, all the measurement parameters used in steps 12 and 17 may be included in the interval calculation initially made, corresponding to the cancellation of steps 17 and 18 from the flow diagram shown in FIG. 2.

After the verification and a correction, if any, the measurement value is evaluated as to credibility (step 19), irrespective of whether said value is comprised within the value interval calculated in steps 12 or 18, or not.

Of course measurement values beyond the above mentioned value interval have a low credibility and are generally not used in the subsequent selection of the final control action, except in particular situations where the measurement results obtained are few or of a poor quality.

The credibility evaluation is effected by comparing said measurement value with the value interval computed in step 12 or the revised value interval calculated in step 18, and on the basis of the result of this comparison by subsequently allotting the measurement value a credibility factor which is stored in the data base of the computer system (step 20), and using said factor in combination with the possibly corrected measurement value for the subsequent selection of the final control action.

The invention will now be explained in further details with reference to the following example.

EXAMPLE

It is desired to control a biological waste water purification plant comprising two treatment tanks which are alternately operated in anoxic and aerobic conditions, and wherein the flow pattern is changed accordingly and so that the untreated waste water is supplied to the anoxic tank (denitrification tank), from which it is carried to the aerobic tank (nitrification tank) and therefrom further on in the plant to a clarification tank, in which a sedimentation of active sludge is carried out, the sludge subsequently being recycled in the plant for introduction into the anoxic tank and from which clarification tank the effluent is discharged.

The control parameters comprise the recycling flow rate and the amount of oxygen supply to the aerobic tank, and the measurement parameters comprise the ammonium concentration, the oxygen concentration and the oxygen supply as far as the aerobic tank is concerned as well as the amount of waste water supplied to the purification plant.

The ammonium concentration in the aerobic tank is measured to 2.6 ppm, and it is calculated that the measurement value has increased by 1.6 ppm compared to the latest measurement carried out, which in the following is expressed as 1.6 ppm per time interval.

Initially a primary evaluation of the measurement value is carried out by investigating whether the absolute measurement value is comprised within a value interval of from 0 to 20 ppm, and whether the change of the measurement value is comprised within a value change interval of from 0 to 5 ppm per time interval.

If both of these criteria are fulfilled, the measurement is approved according to the primary evaluation.

Based on the knowledge of the exact time and day of the week for the measurement, the operational state of the purification plant and past data of the ammonium concentration of the preceding hours and days, a change is expected in the ammonium concentration of 0.9 ppm± 0.4 ppm per time interval, corresponding to an absolute value of 1.9±0.4 ppm.

As the measurement value of 2.6 ppm is not comprised within the above comparative value interval, it is investigated whether there is any identifiable measurement interference resulting from modifications of the pump operation of the purification plant.

By using the mathematical model it is estimated that an increased recycling flow has caused the ammonium concentration in the aerobic tank to increase by 0.2 ppm per time interval.

The measurement value is now corrected for the estimated value, and subsequently the measurement value amounts to 2.4 ppm and the change of the measurement value amounts to 1.4 ppm per time interval. The corrected change measurement value expresses the change arising from the load of the waste water supplied to the aerobic tank during the period of time in question.

As the measurement value of 2.4 ppm is still not comprised within the initially calculated value interval, it is investigated whether the value interval needs to be adjusted, i.e., whether other parameters indicate an increase of the ammonium concentration in the aerobic tank.

A measurement of the amount of waste water supplied to the purification plant shows that the amount is as expected. On the basis of measurements of the oxygen concentration in the aerobic tank and the oxygen supply thereto, the oxygen consumption rate in the tank is calculated, which calculation shows that the oxygen consumption rate is 10% higher than expected.

It is generally assumed that the reaction of the organic matter contained in the waste water and ammonium accounts for 50% of the oxygen consumption, whereas the endogenous respiration of the microorganisms accounts for the remaining 50%. Taking this fact into account, an increase of 10% in the oxygen consumption rate is considered to correspond to an increase of 20% in the rate of change of the ammonium concentration.

Thus, the expected change of the measurement value can now be calculated to 1.08±0.4 ppm per time interval, corresponding to an expected measurement value of 2.08±0.4 ppm.

As will be seen, the corrected measurement value is now comprised within the expected value interval, and the credibility of the measurement is subsequently evaluated by allotting the measurement value a credibility factor, the credibility factor preferably ranging from 0 to 1.

The magnitude of the credibility factor may, e.g., be determined by using the formula Credibility factor =

$$1 - \left| \frac{\text{corrected measurement} - \text{expected measurement value}}{3 \times \text{standard deviation of measurement value}} \right|$$

By using this formula, the credibility factor in the present case can be calculated to 0.73.

The quality evaluated masurement value of the ammonium concentration in the aerobic tank may then form the basis for a decision for a possible change in the setting of the set points for the recycling flow rate and the amount of oxygen supply to the aerobic tank.

I claim:

1. A method of controlling a waste water purification plant comprising the steps of measuring at least two parameters and automatically controlling the plant on the basis of the measurement values obtained using a mathematical model for the purification process, comprising evaluating the quality of the measurement value for at least one parameter on the basis of a comparison of said value with an expected, dynamic value interval calculated continuously on the basis of the mathematical model and a simultaneous measurement of at least one other parameter, and controlling the plant on the basis of said evaluated measurement values.

2. A method according to claim 1, wherein the expected, dynamic measurement interval is determined by calculation of an expected, dynamic value and maximum deviations therefrom.

3. A method according to claim 1 wherein the credibility of the measurement value is evaluated on the basis of the comparison of the measurement value with the expected, dynamic value interval by allocation of a credibility factor which in combination with the measurement value is used in the subsequent selection of the final control action.

4. A method according to claim 1, wherein the measurement value is corrected with a value corresponding to the magnitude of identifiable measurement interference, if any, and that the corrected measurement value is used in subsequent selection of the final control action.

5. A method according to claim 4, wherein the quantification of the identifiable measurement interference is carried out on the basis of the mathematical model and past data of response courses for control modifications of the same type previously made.

6. A method according to claim 1, wherein said method uses an integral control and computer system (control apparatus) collecting and storing measurement results and control signals, processing the collected data using the mathematical model and implementing new control actions.

7. A method according to claim 1, wherein the controlled waste water purification plant is a biological waste water purification plant wherein the purification is carried out by means of microorganisms.

8. A method according to claim 1, wherein a previous measurement of the same parameter is used as a further basis for calculating the expected dynamic value interval.

9. A method of controlling a waste water purification plant comprising the steps of measuring at least two parameters and automatically controlling the plant on the basis of the measurement values obtained using a mathematical model for the purification process, comprising evaluating the quality of the measurement value for at least one parameter on the basis of a comparison of said value with an expected, dynamic value interval calculated continuously on the basis of the mathematical model and a prior measurement of at least one other parameter and controlling the plant on the basis of said evaluated measurement values.

10. A method of controlling a waste water purification plant comprising the steps of measuring at least two parameters and automatically controlling the plant on the basis of the measurement values obtained using a mathematical model for the purification process, comprising evaluating the quality of the measurement value for at least one parameter on the basis of a comparison of said value with an expected, dynamic value interval calculated continuously on the basis of the mathematical model and both a simultaneous and a prior measurement of at least one other parameter and controlling the plant on the basis of said evaluated measurement values.

* * * * *